Oct. 27, 1953 H. W. AUGUSTADT 2,657,264

AUTOMATIC VOLUME CONTROL

Filed Sept. 17, 1949

INVENTOR
H. W. AUGUSTADT

BY

AGENT

Patented Oct. 27, 1953 2,657,264

UNITED STATES PATENT OFFICE 2,657,264

AUTOMATIC VOLUME CONTROL

Herbert W. Augustadt, Westfield, N. J., assignor to Bell Telephone Laboratories, Incorporated, New York, N. Y., a corporation of New York Application September 17, 1949, Serial No. 116,397

8 Claims. (Cl. 179—1)

This invention relates to an improved automatic volume control system adapted to control the level of a sound program reproduced in a noisy listening area. The apparatus herein disclosed is termed an "interval adjusting" system for the reason that the volume control is operated in accordance with the noise level in the listening area during the interval preceding the rendition of a program to set the gain of the sound reproducing system for the next program selection. During the rendition of a selection, the control of volume is suspended until the next program interval.

Systems of control apparatus for this purpose are known to the art, as well as "continuously adjusting" systems in which the program level is continuously variable in accordance with the noise level variation. The continuously adjusting system sometimes is subject to the disadvantage that variations of program level with noise level during a program cause impairment of the musical or dramatic character of the selection. On the other hand, interval adjusting systems in some forms are unable to control the program channel gain in accordance with the noise in the later portion of the interval preceding the program. Experience has shown that this is the noise level likely to interfere most with the next program rendition.

The general object of the invention is to provide an improved method and apparatus for automatically so controlling the level of a sound program, reproduced in a noisy listening area, that the reproduced sound is always at a level pleasingly above the noise.

Another object of this invention is to provide a method and apparatus for controlling the reproduced sound level in accordance with the noise condition in the area during the interval preceding the rendition of a sound program; in particular, in accordance with the noise level in the later part of the interval.

The system disclosed may be conveniently connected to the volume control element of any existing sound program reproducing system without alteration of the latter and the provision of such a facility is another object of the invention. A further object of the invention is to provide such an automatic volume control including means for disabling the control except during the interval between program renditions and restoring the control when a rendition ends.

A feature of the invention is the provision of means for making the change in sound level in any desired ratio to the change in noise level.

Another feature is the provision of means for selectively limiting the program gain at higher noise levels.

An advantage of the interval adjusting system herein disclosed is the avoidance of the differential circuit enabling the program channel level to be subtracted from the combined level of program and noise; such a circuit is required in continuously adjusting systems.

The reader is referred to the following description of a preferred embodiment of the invention, schematically set forth in the accompanying drawings, in which.

In all figures, like numerals designate like elements.

Figures 1, 2, 3:
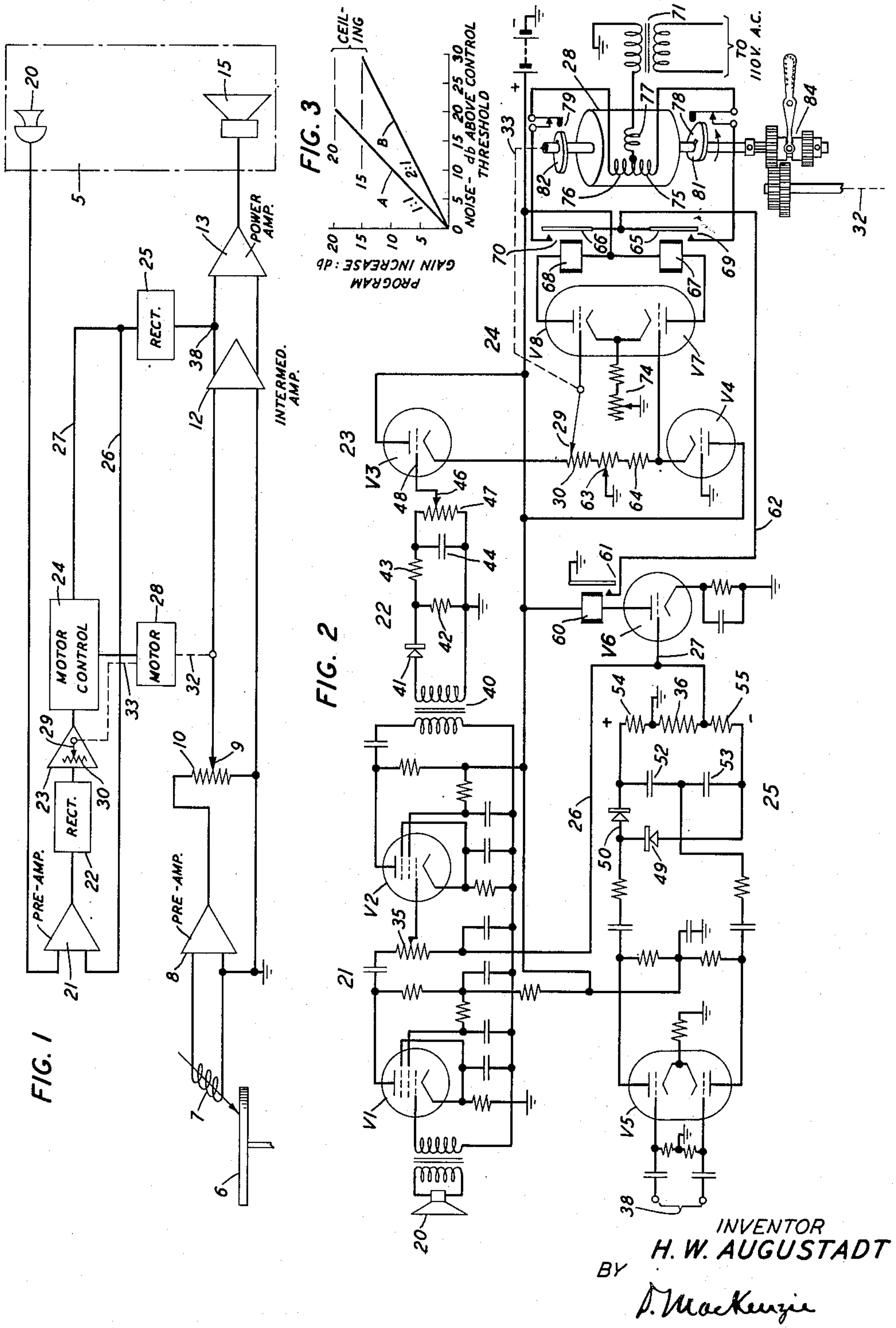
Fig. 1 is a block diagram of the system of the invention as applied to the reproduction of a disc sound record.
Fig. 2 is a schematic circuit diagram of the apparatus interrelating the program and noise channels of Fig. 1 to govern the operation of the program gain control.
Fig. 3 shows curves relating the noise level in the program interval to the gain change thereafter effected in the program channel, together with the restriction of program gain to a selected ceiling value.

Referring first to Fig. 1, 5 designates generally the listening area in which a sound program is being reproduced from disc 6 driven by a turntable and motor not shown. The sound record on disc 6 is translated by pick-up 7 into voltages representing the sound recorded on the disc and these voltages are amplified by a conventional preamplifier 8 followed by gain control potentiometer 10, intermediate amplifier 12 and power amplifier 13 feeding loudspeaker 15. It is understood that by means of brush 9, potentiometer 10 is initially adjusted to provide in area 5 a satisfactory sound level in the absence of noise or in the presence of a threshold noise level.

In listening area 5 is located microphone 20, exposed to noise and to program sound, with its output connected to a circuit including amplifier 21, which is disabled when a program selection begins. During the interval between program selections, amplifier 21 suitably amplifies the noise voltage generated in microphone 20, and this amplified voltage is rectified by rectifier 22 to be applied through differential amplifier 23 to motor control circuit 24.

Similarly, the sound program voltage at the output of amplifier 12 is rectified by rectifier 25 and applied by conductors 26 and 27 to disable amplifier 21 and control circuit 24, respectively. Control circuit 24 is thus active only during the interval between successive programs. When active, it controls motor 28, which may be either an alternating or direct-current reversible motor.

Brush 29 on potentiometer 30, included in differential amplifier 23 and described in connection with Fig. 2, controls the magnitude of the rectified voltage fed from rectifier 22 to control circuit 24. When motor 28 is operated, it varies oppositely in magnitude the voltages derived from potentiometers 10 and 30. These controls are effected through motor shaft extensions 32 and 33.

Referring now to Fig. 2, microphone 20 is succeeded by vacuum tubes V1 and V2, which may be 6SH7's, constituting preamplifier 21 of Fig. 1. Tubes V1 and V2 are resistance coupled, and their circuit connections are conventional except that the grid return circuit of tube V2 includes potentiometer 35 in series with resistance 36 to ground. Across the latter resistance unidirectional voltage, negative to ground, may be applied to annul the conductivity of tube V2 and so disable the microphone channel at the input to tube V2. Anode voltage may be from any proper source and other power supplies, for these and other tubes in the apparatus of Fig. 2, are understood but not shown. Microphone 20 may be a permanent magnet speaker, for example, of which the voice coil is connected to the primary of a high step-up transformer; the quality of the microphone response is of minor importance.

With no deactivating voltage across resistance 36, tube V2 and transformer 40 supply the amplified noise voltage to rectifier 22, which includes rectifier 41 operating into resistor 42, conveniently 150,000 ohms. The last-named element is shunted by a time constant circuit comprising resistor 43, potentiometer 47 and condenser 44, having a time constant of approximately 50 seconds. By brush 46 on potentiometer 47 (1 megohm) shunting condenser 44, a suitable fraction of the condenser voltage is applied to grid 48 of tube V3. Tube V3, and tube V4 shown below in Fig. 2, may be the two halves of a 12AU7. These tubes constitute differential amplifier 23 of Fig. 1. The unidirectional positive voltage applied thus to grid 48 is substantially proportional to the noise power prevailing in listening area 5, Fig. 1.

A noise representative voltage to ground on grid 48 of tube V3 exists except when noise is absent from area 5 or when a negative voltage across resistor 36 disables tube V2. When tube V2 is so disabled, the charge on condenser 44 leaks off through potentiometer 47 in parallel with resistors 42 and 43 in series. The disabling voltage across resistor 36 is produced when a program selection begins, as will now be explained. The discharge time constant for condenser 44 is also about 50 seconds.

Across the output circuit of amplifier 12, Fig. 1, is connected (terminals 38) the input of a 12SN7 push-pull tube V5, Fig. 2. This input circuit is a high impedance bridged across the program channel, thus subtracting nothing from the sound record power transmitted from amplifier 12 to loudspeaker 15. The output of tube V5 is rectified by rectifier 25, comprising varistors 49 and 50 which charge condensers 52 and 53, each 125 microfarads, in a voltage doubling connection and shunted by resistors 54, 36 and 55 in series, ground being connected to the junction of resistors 54 and 36. Resistors 54, 36 and 55 are of resistances suitably 250K, 330K and 250K, respectively, where K indicates 1000 ohms. The resistances through which condensers 52 and 53 are charged are made conveniently small, so that on the appearance of a program voltage at terminals 38 there promptly appears a rectified voltage negative to ground across resistors 55 and 36 in series, disabling tubes V2 and V6.

The negative voltage so produced is roughly proportional to the program power, and is applied via conductor 26 to disable tube V2 and via conductor 27 to disable tube V6. It is to be understood that tube V6 is arranged to be conducting in the absence of a negative voltage on conductor 27. When tube V6 is conducting, relay 60 in its anode circuit is energized and closes contact 61 applying ground to conductor 62.

The condition shown in Fig. 2 is that of a period of program reproduction at normal gain and low noise. When the program ends, condensers 52 and 53 (in series) discharge through resistors 54, 36 and 55; the disabling voltage disappears, tube V6 becomes again conducting and the microphone circuit is reenabled to provide a noise voltage on grid 48 of tube V3. With the values of capacitance and resistance mentioned, the time constant of the discharge circuit of condensers 52, 53 is of the order of 50 seconds, about the same as that of the circuit 43—44—47 in the microphone channel.

The revival of the noise representative voltage on grid 48 thus comes about gradually, becoming complete about three minutes after the program ends. This enables the control circuit 24 to function during the latter part of the interval between successive program renditions. When the next rendition begins, tube V6 is rapidly disabled along with tube V2 and the motor control circuit is thereupon promptly disabled regardless of the rate of discharge of condenser 44.

After the rendition of a program selection, the input voltage to V5 disappears and following it presently disappears the disabling voltage on conductors 26 and 27. Tube V6 regains conductivity and ground is applied via conductor 62 to armatures 65, 66 of relays 67, 68. The windings of these relays are in the anode paths of tubes V7 and V8, respectively, controlled as now to be described by differential amplifier 23.

Amplifier 23 comprises tubes V3 and V4, each supplied conventionally with anode voltage. Grid 48 of V3 is connected to tap 46 on potentiometer 47 in the microphone channel, while the corresponding grid of V4 is grounded. The cathodes of tubes V3 and V4 are joined through potentiometers 30 and 63 and resistor 64 in series. In the absence of voltage at grid 48 of V3 and at terminals 38, and with brush 29 meeting potentiometer 30 at the junction of the latter with the cathode of V3, as shown in Fig. 2, a preliminary adjustment is made of the ground connection on potentiometer 63 to provide that the anode currents traversing the windings of relays 67 and 68 shall be the same.

The joined cathodes of tubes V7 and V8 are connected to ground through adjustable resistor 74, the adjustment of which increases or decreases the equal currents in the windings of relays 67, 68 making these currents suitably less than "operate." The voltage across resistor 74 is then such as to make suitably negative the grids of V7 and V8 with respect to their joined cathodes.

With this adjustment, both relays 67 and 68 remain unoperated; tubes V3 and V4 are both conducting while the current from cathode of V3 to ground is ready to be raised by a positive voltage applied to grid 48 of V3. Tubes V7, V8 may be the halves of a 6SC7; tube V6, a 6C4. Neither of contacts 69, 70 is closed, so that regardless of contact 61 no voltage to the driving windings of motor 28 is received from transformer 71, supplied with alternating voltage from any convenient source. It is clear that motor 28 may be a direct-current motor instead of the alternating-current motor shown, with obvious changes in its supply circuit.

Tube V4, with its grid grounded, is stabilized against anode voltage variation by negative feedback through its cathode resistor 64 in series with part of potentiometer 63; it thus furnishes a reference voltage for the grid of tube V7, controlling the current in the winding of relay 67 unless this is disturbed by a change in voltage at brush 29.

The adjustment just described of the currents of relays 67, 68 may be made in the absence of program and of noise in area 5 or in the presence of a noise level considered tolerable, which may be referred to as the "threshold" noise level. Assuming the adjustment selected as desired and relays 67, 68 both released, no current flows in any of the three windings of motor 28. There being no program in progress, tube V6 is conducting, contact 61 is closed by the operation of relay 60, and one or the other of armatures 65 66 is ready to be grounded when noise appears, or exceeds the threshold level, at microphone 20. This grounding comes about as follows:

A rectified positive voltage proportional to the average noise level is impressed on grid 48 of tube V3, the space current of that tube increases and the greater voltage drop in cathode resistor 39 makes less negative the grid voltage of tube V8. Current through relay 68 rises to the "operate" value, contact 70 is closed and ground is applied to stator winding 76 of motor 28. Current from transformer 71 flows through winding 76 and rotor winding 77, motor 28 turns in such direction as to drive brush 29, through proper connection of shaft extension 33, to pick off a lower voltage from potentiometer 30. The motion of brush 29 continues in this direction until the voltage it takes from potentiometer 30 falls to the value permitting release of relay 68. Obviously, the shaft rotation of motor 28 is proportional to the increase in noise level; it resumes in the same direction as before if the noise level further increases.

The increased space current in tube V8 is accompanied by an increase in voltage drop over joint cathode resistor 74 and so by a decrease in space current in tube V7. This last effect in part counteracts the increase in voltage drop over resistor 74, but the net result is that the space current of tube V7 decreases below its "less than operate" value as that of tube V8 increases to its "operate" value.

Since the release current of the relay is somewhat less than its operate current, there will be in the motion of brush 29 a slight overshoot. This can be made negligibly small by choice and adjustment of the relay and by setting the "less than operate" current above mentioned intermediate between release and operate values. Such choice and adjustment are well known.

Now, if the noise level decreases and with it the voltage on grid 48 of tube V3, there will be a decrease in the current in tube V8 and an accompanying lessened voltage drop in resistor 74.

The lower cathode voltage of tube V7 now permits that tube to become more conducting and relay 67 operates, relay 68 remaining released because of the lower volage now present at brush 29. Contact 69 closes and ground is applied to armature 65; current flows in stator winding 75 and winding 77, and motor 28 turns in the opposite sense to move brush 29 to derive a higher voltage from potentiometer 30. This opposite motion continues until there is again established the condition where both relays 67 and 68 are released.

It is commonly desirable to limit the gain variation in the program channel and to limit correspondingly the response of motor 28 to voltage variation across potentiometer 30. For this purpose limit switches 78 and 79, in series respectively with stator windings 75 and 76, are provided.

When the noise level decreases and relay 67 operates to close contact 69, motor 28 will turn in the direction of the arrow to drive brush 29 upward on potentiometer 30. Since the release current is less than the operate current for relay 67 and motor 28 would slightly overshoot and brush 29 would be driven past an end stop on potentiometer 30; to prevent this cam 81 on the motor shaft is provided to open at this point switch 78, shown in Fig. 2 about to open.

Correspondingly, cam 82 opens switch 79 when motor 28 has operated in response to noise level high enough to cause the descent of brush 29 to a chosen lower position on potentiometer 30.

For convenience, motor 28 is drawn as capable of only 180 degrees rotation. Actually, of course, in a practical apparatus a large internal gear reduction would be used so that cams 81 and 82 turn slowly and are so set as to permit a rotational movement as large as is permitted to brush 29 by the construction of potentiometer 30, which may be a commercial circular potentiometer allowing some 270 degrees rotation of brush 29.

The placement shown in Fig. 2 of cams 81 and 82 corresponds to the extreme variations in noise level and program gain which the system is designed to accommodate. Suppose a noise level variation of 30 decibels is to be expected, and it is desired that the program level shall not vary through that entire range. The cams are then each so shaped and located on the motor shaft as to disable the motor circuit when the motor rotation equals a chosen angle from the initial position corresponding to threshold noise level. Now, when the noise level rises through a chosen range above threshold, cam 82 opens switch 79; when the noise level falls to the threshold value, cam 81 opens switch 78; in either case, motor 28 is disabled regardless of the further rise or fall, as the case may be, in noise level. There is thus imposed a ceiling on the gain setting at which the program channel may reproduce the program.

It will be seen from the above description of the circuit of Fig. 2 that as the noise level (in the absence of program) rises or falls, motor 28 turns to decrease or increase, respectively, the portion of the voltage across potentiometer 30 which is picked off by brush 29. The change in this portion may be either linear with motor rotation or by proper construction of potentiometer 30 may be made any desired function of the angular position of shaft extension 33.

Preferably, the over-all relationship is such that equal decibel changes in noise level correspond to equal angular rotations of the motor driven shafts and that 30 decibels change in noise level shall move brush 29 over the available range on potentiometer 30. At the chosen threshold noise level, brush 46 is set on potentiometer 47 to provide that brush 29 shall stand at the end stop of potentiometer 30 adjacent to resistor 83.

The shaft of motor 28 carrying cam 81 is provided with gears 84 selectively coupling it to shaft 32; any suitable coupling may here be used. For simplicity, two coupling ratios are indicated; these should be determined in practice by the consideration that the available motion of brush 9 on potentiometer 10 shall correspond to the available motion of brush 29 on potentiometer 30.

As already mentioned in the description of Fig. 1, extension 32 controls the position of brush 9 on program channel gain control potentiometer 10. The variation in the voltage portion selected by brush 9 may be linear, as suggested by the showing of Fig. 1, or may be any desired function of brush position. The variation is preferably logarithmic: equal intervals in decibels correspond to equal shaft rotations.

By choice of ratio of gears 84, Fig. 2, it may be arranged that the gain of the program channel shall be changed 5 decibels when the noise level changes by that amount, rise in noise level above the tolerable threshold value producing an equal increase in program channel gain relative to a previously established minimum. Thereafter, noise level variation up or down produces a corresponding up or down gain change in the program channel. By choosing for gears 84 a suitable ratio, the change in program channel gain may be made one-half the change in noise level. Other gear ratios and corresponding other relations between noise level and program gain variations may be provided.

The noise channel for microphone 20 through tube V1 is always active, but when a program selection begins the capacity of the noise channel to make further changes at either brush 29 or brush 9 is suspended by the appearance of a negative rectified voltage on conductors 26 and 27, derived from the program voltage at terminals 38 between intermediate amplifier 12 and power amplifier 13.

The effect of the ceiling adjustment above mentioned, together with the choice of gear ratio for gears 84, is shown in Fig. 3. Here by ceiling 15 is meant that switch 79 is opened by cam 82 when motor 28 has turned to bring about an increase of 15 decibels above the normal gain setting of brush 9, Fig. 1. This program gain corresponds to a noise level change of 15 decibels above the control threshold, for a level change ratio of 1:1; or to a noise change of 30 decibels if that ratio is 2:1. Ceiling 20 corresponds to a noise level change of 20 decibels for ratio 1:1.

In Fig. 3, curves A and B exhibit relations between change in program gain produced by the apparatus of Fig. 3 in response to noise level changes in the interval preceding the program. Curve A shows the result when gears 84 provide the 1:1 level change ratio; curve B, the result when that ratio is 2:1. By adjustment as previously described of cam 82 the extreme change in program gain is limited to 20 decibels for curve A, to 15 decibels for curve B.

Fig. 3 likewise enables evaluation of the signal-to-noise ratio of the system. For curve A, program level changes as fast as noise level, so that up to the ceiling value signal-to-noise ratio remains constant; after that program level remains constant as noise level increases, so that signal-to-noise ratio is lost decibel for decibel as noise level increases. Thus for curve A and 15-decibel ceiling, signal-to-noise ratios for noise change figures of 0, 15 and 30 decibels, assuming an initial ratio at noise threshold of 20 decibels, will be, respectively, 20, 20 and 5 decibels. Similarly for curve A and 20-decibel ceiling, ratios for noise change figures of 0, 20 and 30 decibels, assuming the same initial ratio will be respectively, 20, 20 and 10 decibels. For curve B, program level changes half as fast as noise level throughout the characteristic. Accordingly, for similar assumptions on initial ratio, the ratios at noise change figures of 0, 15 and 30 decibels will be, respectively, 20, 12½ and 7½ decibels. Obviously a ceiling could be used with curve B as well, in which case the rate of losing signal-to-noise ratio would be increased beyond the point at which the ceiling was reached.

While curves A and B are shown as straight lines, a shape obtainable by suitable shaping of potentiometers 10 and 30 of Fig. 1, this straightness is not practically necessary, because satisfactory operation can be obtained even when the curves are moderately S-shaped.

The apparatus shown in Fig. 2 is readily applied to any existing sound reproducing or transmitting system. It is necessary only to bridge tube V5 across the program line, conveniently but not necessarily between amplifiers 12 and 13, and to connect shaft extension 32 to brush 9 of gain control potentiometer 10.

When several minutes of the interval between program selections has elapsed, differential amplifier 23 and motor control circuit 24 operate motor 28 as described above to set brush 9 at a point on potentiometer 10 in accordance with the noise condition just prior to the beginning of a new program. The program begins, tubes V2 and V6 are at once disabled and therewith the noise channel, motor 28 is motionless and the program gain it established just before the program began is fixed until the program ends. Thereupon condensers 52, 53 begin to discharge through resistors 54, 36 and 55; their discharge is completed in several minutes concomitantly with the revival of noise voltage at grid 48. The conductivity of tube V6 is then fully restored and the noise voltage is in full control of program gain.

It will be observed that for any noise level in area 5 there is a position of the shaft of motor 28 where the currents in relays 67 and 68 are equal and slightly below their operate values. As the noise level changes, a greater than operate current flows in the winding of one relay, while the current in the other relay is further reduced. Motor 28 moves to change the voltage applied to the control grid of tube V8 until the relay currents are essentially rebalanced. The effect is to restore this applied voltage to the value corresponding to the condition of no noise (or noise of a chosen threshold level) in the listening area. Other apparatus than that specifically described for effecting this restoration may readily be devised.

Throughout the system disclosed, apparatus elements alternative to those specifically described are known to the art and may be used in this invention.

What is claimed is:

1. In an electrical sound program system of variable gain reproducing a sound program in a noisy listening area, means for controlling the gain of the system in accordance with the noise level in the area preceding the program comprising means to detect the presence of program power in the system, a switching device, means whereby said switching device is controlled by said detecting means, disabling circuits for said gain controlling means, and means whereby said disabling circuits are controlled by said switching device.

2. In an electrical sound program system of variable gain reproducing a sound program in a noisy listening area, means for controlling the gain of the system in accordance with the noise level in the area preceding the program comprising noise pick-up means, electrical amplifying means, means whereby said amplifying means is controlled by the pick-up means for providing a voltage varying with the noise level, a pair of relays, means for differentially controlling said relays by a variable fraction of said voltage, motor means for varying simultaneously and oppositely the gain of the system and the fractional voltage, means including said relays for driving the motor means to vary the fractional voltage in the sense opposite to the variation in noise level, and means for disabling the driving means and means whereby said disabling means is responsive to program power in the system.

3. Means as in claim 2 for varying the gain of an electrical sound program including means for disabling the driving means at a selectable maximum increase in gain.

4. Means as in claim 2 for varying the gain of an electrical sound program system including means for establishing a desired relation between the variation in gain of the system and the opposite variation in the fractional voltage.

5. Means as in claim 2 for varying the gain of an electrical sound program system including means for disabling the driving means at a selectable maximum value of the variable fraction.

6. In an electrical sound program system of variable gain reproducing a sound program in a noisy listening area, means for controlling the gain of the system in accordance with the noise level in the area preceding the program comprising noise pick-up means, electrical amplifying means, means whereby said amplifying means is controlled by the pick-up means for providing a voltage varying with the noise level, means for deriving from said voltage a variable fractional voltage, motor means for varying simultaneously and oppositely the gain and the fractional voltage, means whereby said motor means is controlled by the fractional voltage to vary the fractional voltage in the sense opposite to the variation in noise level, means for disabling the driving means, and means whereby said disabling means is responsive to program power in the system.

7. For an electrical sound system comprising an adjustable gain-control potentiometer and reproducing sound in a noisy listening area, means for controlling the gain of the system in accordance with the noise level in the area preceding the beginning of sound reproduction therein comprising noise pick-up means for generating an alternating voltage proportional to the noise, means for amplifying and rectifying the generated voltage, a differential amplifier including a pair of thermionic vacuum tubes having each a cathode, a control grid and an anode, the cathodes being joined by a resistance of which an intermediate point is grounded, power supply for said tubes, means for applying to the control grid of one of the tubes an adjustable fraction of the rectified voltage, the control grid of the other tube being at a fixed potential, a pair of relays, means for differentially controlling said relays by a variable fraction of the cathode voltage of the one tube in opposition to the cathode voltage of the other tube, motor means including said relays to vary the fractional voltage to equality with the opposing voltage and simultaneously to vary in the opposite sense the adjustment of the potentiometer and means for disabling the gain controlling means on the beginning of sound reproduction including means for deriving from the system an alternating voltage proportional to the reproduced sound, means for amplifying and rectifying the derived voltage, means for disabling the first-named amplifying and rectifying means and the motor means, and means whereby said disabling means is put under the control of the rectified derived voltage.

8. For an electrical sound program system reproducing programs in a noisy listening area alternately with intervals of no program, said system including a potentiometer on which the position of a first brush controls the gain of the system, apparatus for controlling the program sound level in accordance with the noise level during the preceding interval of no program comprising a microphone in the listening area for providing an alternating voltage representative of the noise therein, means for amplifying the noise representative voltage, means for rectifying the amplified voltage, said rectifying means including means for integrating the rectified voltage during the interval, a first and a second pair of vacuum tubes having each a cathode, a control grid and an anode, power supply for said tubes, the cathodes of the tubes of the first pair being joined through a resistance including a second potentiometer in series with a fixed resistance of which an intermediate point is grounded, the cathodes of one and of the other tube of the first pair being connected respectively to the end of the potentiometer remote from ground and to the like end of the fixed resistance, the grid of said other tube of the first pair being grounded, the cathodes of the tubes of the second pair being jointly grounded through a common resistance, the grid of one tube of the second pair being connected to a second brush on the second potentiometer, while the grid of the other tube of the second pair is connected to the cathode of the other tube of the first pair, a first and a second relay, means for controlling said relays by the anode currents respectively of the one and of the other tube of the second pair, means for adjusting said currents to be initially equal and intermediate between the release and operate currents of the relays, means for varying the current controlling the first relay and simultaneously oppositely varying the current controlling the second relay in accordance with the variation in the noise level including means for applying to the grid of said one tube of the first pair a chosen fraction of the integrated voltage, thereby varying the voltage at the brush of the second potentiometer and operating one of the relays, motor means, means whereby said motor means is controlled by the operated relay to readjust the second brush to rebalance the anode current of the tubes of the second pair and simultaneously to readjust the first brush to vary the gain of the system in the same sense as the variation in noise level and means for disabling the motor means on the commencement of a program, said last-named means comprising means for deriving from the program system an alternating voltage representative of the program power, means for amplifying and rectifying the program representative voltage, and means for applying the last-named rectified voltage to disable the first-named amplifying means and the motor control by the operated relay.

HERBERT W. AUGUSTADT.

References Cited in the file of this patent

UNITED STATES PATENTS

| Number | Name | Date |
|---|---|---|
| 2,155,807 | Stimson | Apr. 25, 1939 |
| 2,338,551 | Stanko | Jan. 4, 1944 |
| 2,382,848 | Baumgartner | Aug. 14, 1945 |
| 2,392,218 | Anderson | Jan. 1, 1946 |
| 2,420,933 | Crawford | May 20, 1947 |
| 2,457,712 | Olson et al. | Dec. 28, 1948 |
| 2,462,532 | Morris | Feb. 22, 1949 |
| 2,466,216 | Ekstrand | Apr. 5, 1949 |
| 2,503,391 | Kannenberg | Apr. 11, 1950 |
| 2,517,629 | Buys et al. | Aug. 8, 1950 |